March 13, 1962     J. R. WILKINSON     3,024,873

DISK BRAKE

Filed Aug. 19, 1960

INVENTOR.
JOHN R. WILKINSON
BY
Christie, Parker & Hale
ATTORNEYS.

3,024,873
DISK BRAKE

John R. Wilkinson, West Covina, Calif., assignor to Thomas J. Pierson and Faye M. Pierson, both of West Covina, Calif., joint tenants
Filed Aug. 19, 1960, Ser. No. 50,786
4 Claims. (Cl. 188—73)

The invention relates to disk brakes, particularly a mechanically actuated spot disk brake for midget vehicles.

The purpose of the invention is to provide a disk brake of the type described which is simple, reliable, inexpensive to manufacture, quick-acting, and efficient, and which minimizes deflection of the brake disk from its plane of rotation when the brake is actuated. Minimal deflection of the brake disk from its plane of rotation when the brake is actuated is highly advantageous because it results in minimal cold-working, fatigue stressing and permanent deformation of the disk, which otherwise may lead to structural failure of the disk, brake vibration, and inefficient braking action.

The apparatus of the invention includes a housing which has a pair of brake shoes disposed movably in the housing in spaced, aligned relation to each other. A peripheral portion of a rotatable brake disk fixed to a shaft to be braked extends between the pair of brake shoes. Means is provided for each brake shoe for varying and selectively fixing the distance of that brake shoe from the brake disk and from the other brake shoe. Means is rotatably carried on the housing for moving the shoes together to frictionally engage the brake disk responsive to rotation of such means in one direction and for moving the brake shoes apart to disengage the brake disk responsive to rotation of such means in the opposite direction.

Figure 1:
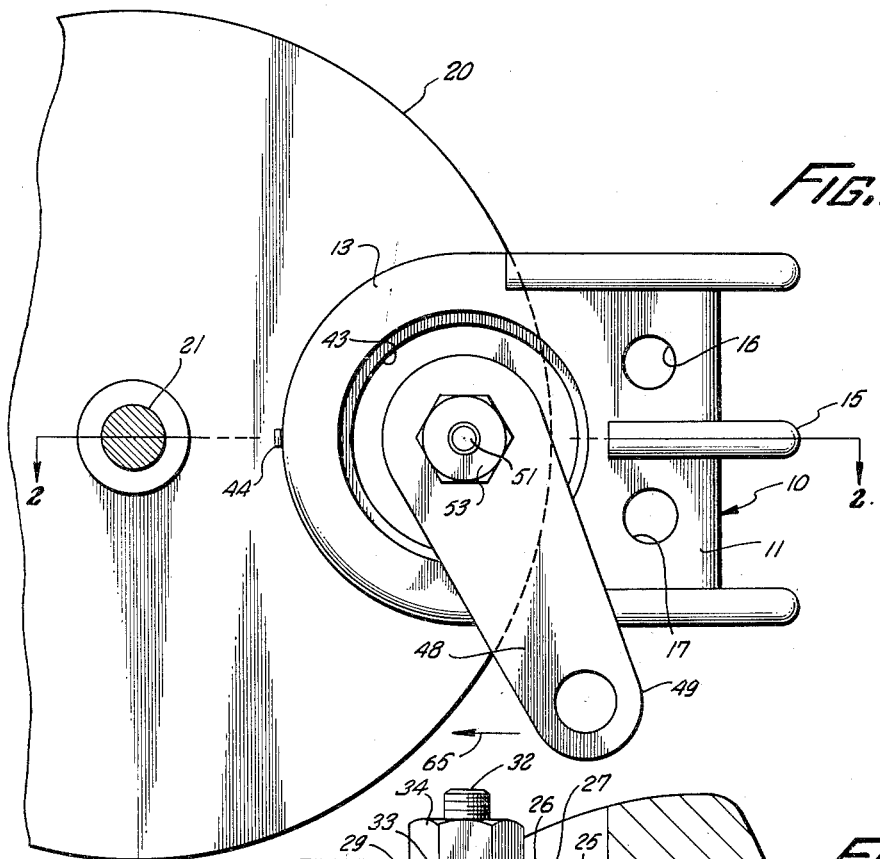
Figure 2:
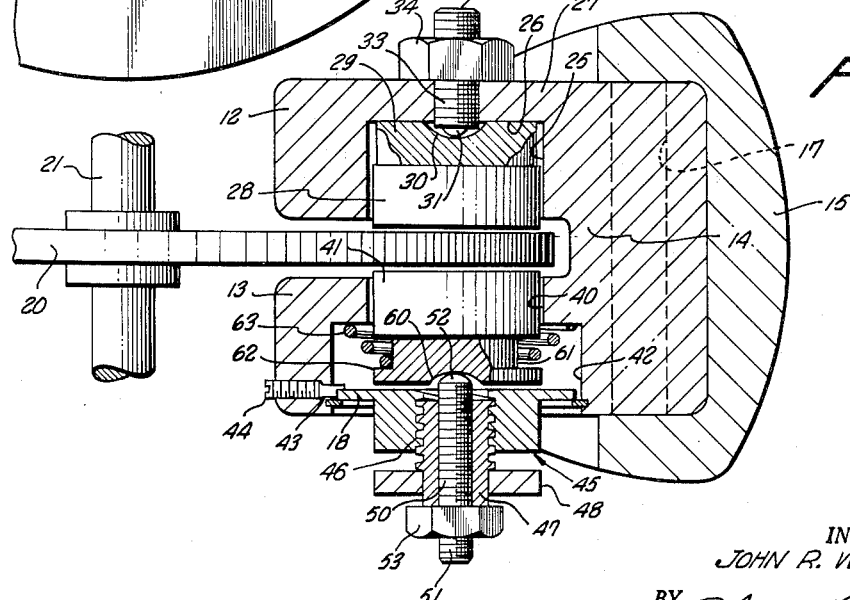

The invention will be fully understood from the following description thereof taken in conjunction with the accompanying drawings, in which:

FIG. 1 is a side view of the invention; and
FIG. 2 is a view, partially in section, along the line 2—2 in FIG. 1.

Referring to the drawings, 10 represents generally a spot disk brake embodying the invention. The brake includes a U-shaped housing 11 which, as shown in FIG. 2, has legs 12 and 13 forming the legs of the U on the base 14 thereof. The housing 10 is made of aluminum or similar material and has integral heat-dissipating fins, such as the fin 15. The housing is adapted to be immovably fixed to the chassis of a vehicle by means of bolts extending through holes 16 and 17 therein.

A circular metal brake disk 20 is fixed to a rotatable axle 21 to be braked, such as the rear axle of a vehicle, in conventional manner so that the brake disk 20 and the axle 21 rotate as a single unit. The peripheral portion of the brake disk 20 extends between the legs 12 and 13 of the housing for selective frictional engagement thereof to effect braking of the axle 21.

A cylindrical opening 25 extends into the leg 12 from the inside face thereof and bottoms at 26 to form a web 27 in the housing extending between the opening 25 and the exterior of the housing. Rotatably and freely disposed in the opening 25 is a cylindrical brake shoe 28 made of conventional high friction material from which brake linings are made. Rotatably and freely disposed in the opening 25 between the brake shoe 28 and the web 27 is a cylindrical bearing plate 29 which has a hemispherical centrally located recess 30 in one face in which the rounded end 31 of an adjustment screw 32 seats.

The adjustment screw 32 is threadedly received in the web 27 at 33. The adjustment screw 32 may be releasably fixed against rotation by means of a nut 34 threadedly received on it exteriorly of the housing which can be tightened into bearing engagement with the exterior surface of the web 27 to jam the threads 33 and thus prevent rotation of the adjustment screw 32.

The adjustment screw 32 and the free mounting of the bearing plate 29 and brake shoe 28 are advantageous features of the invention because they permit adjustment of the amount of the brake shoe 28 which extends from the inside face of the leg 12 of the housing and the amount of clearance between the brake shoe 28 and the brake disk 20. The brake shoe 28 and and bearing plate 29 bear against each other but are not connected together, so that the brake shoe 28 may be replaced without replacing the bearing plate 29. The rotatable and free disposition of the brake shoe 28 in the opening 25 is advantageous because it permits the brake shoe to rotate freely within its receiving opening 25 and thereby evenly distribute wear over its face which engages the brake disk 20.

In the other leg 13 of the housing is a cylindrical opening 40 of the same diameter as the opening 25 and concentric therewith. Rotatably and freely disposed in the opening 40 is a second brake shoe 41 identical to the above described brake shoe 28. A counterbore 42 extends into the leg 13 of the housing from the exterior thereof concentrically with the opening 40 and terminates interiorly of the leg 13.

Disposed in the counterbore 42 is a collar 45 which has an integral outwardly extending circumferential flange 18. A retaining C ring 43 removably disposed in a circumferential groove in the surface of the counterbore 42 and a setscrew 44 threadedly received in the leg 13 hold collar 45 in the counterbore 42, the setscrew 44 seating in a recess in the periphery of the flange 18 on the collar to prevent rotation thereof and the retaining ring 43 bearing against the peripheral portion of the flange 18 to prevent removal of the collar from the counterbore. The collar 45 has a central bore substantially concentric with the openings 25 and 40 which at 46 threadedly receives an actuating sleeve 47. The actuating sleeve extends exteriorly of the housing, and an actuating arm 48 is securely fixed in conventional manner to the exterior end of the sleeve for rotation with the sleeve as though the actuating arm 48 and the sleeve were a single unit.

The nature of the threaded engagement 46 between the actuating sleeve 47 and the collar 45 is of considerable importance to the invention. It is a high bearing strength, large lead thread designed for the transmission of power. A 5-pitch Acme double thread or a comparable multiple thread of on the order of 5-pitch meets the above requirements for the threaded engagement 46 and is an important aspect of the invention. A multiple thread gives high bearing strength between the sleeve and the collar, a large lead, and has a large minor diameter which results in minimal reduction of the cross-sectional area, and hence strength, of the sleeve 47. A double thread of on the order of 5-pitch results in a large enough lead, or axial displaceemnt of the sleeve responsive to rotation thereof relative to the collar, to adapt such threaded engagement to be the means for actuating the brake shoes as described below. It is to be understood that a suitable helical cam or rotary inclined plane engagement operating in similar manner to a threaded engagement may be substituted to perform the functions of the threaded engagement 46. Application of force to the end 49 of the actuating arm 48 by means of conventional linkage extending to the brake pedal of the vehicle rotates the actuating sleeve 47 relative to the collar 45 and thus moves it inwardly or outwardly, depending on the direction of rotation, to effect braking action when it is moved inwardly and permit release of braking action when it is moved outwardly, as explained below. Since the actuating arm 48 is rotated but a fraction of a revolution to effect braking, in particular, on the order of 80 degrees of rotation, it is apparent that the threaded engagement 46 must have a large enough lead to effect sufficient axial displacement of the sleeve to actuate the brake responsive to such rotation of the sleeve, and the above described thread is adequate in this regard.

Threadedly received at 50 in the central bore in the actuating sleeve 47 is an adjustment screw 51. The adjustment screw 51 extends through the sleeve to terminate in a rounded end 52 at one end and threadedly receives on its other end exteriorly of the housing a nut 53. The nut 53 may be tightened to bear against the sleeve 47 and thus jam the threads 50 to releasably fix the adjustment screw 51 against rotation thereof relative to the sleeve.

The rounded end 52 of the adjustment screw engages a rounded centrally located depression 60 in a cylindrical actuating piston 61 disposed within the counterbore 42 which engages the brake shoe 41. There is only bearing engagement between the piston 61 and the brake shoe 41 so that the brake shoe is free to rotate within the opening 40 for the same advantageous reasons as described above in connection with the similar feature of the brake shoe 28.

An annular circumferential flange 62 extends outwardly from the actuating piston, and a conical compression return spring 63 is disposed in the counterbore in compressed condition with one end in engagement with the shoulder of the counterbore 42 and the other end in engagement with the flange 62 on the actuating piston. The return spring 63 functions to bias the actuating piston against the adjustment screw 51 to eliminate play therebetween and also to bias the actuating piston away from the brake disk 20 so that upon release of braking action by rotation as a unit of the actuating sleeve 47 and the adjustment screw 51 to effect axial movement thereof away from the brake disk 20, the actuating piston follows the sleeve and screw away from the brake disk to release frictional engagement of the brake disk by the brake shoes 28 and 41.

By loosening the nut 53 on the adjustment screw 51, it can be rotated and, through its threaded engagement with the sleeve 47, moved relative thereto to effect adjustment of the brake shoe 41 with respect to the amount of its extension from the inside face of the leg 13 and also with respect to its spacing from the brake disk 20, in the same manner as described above for the brake shoe 28 and the adjustment screw 32. Once proper adjustment of the brake shoe 41 has been achieved, the adjustment screw 51 may be releasably locked in such position by tightening the nut 53 to bearing engagement with the actuating sleeve 47 to jam the threads between the actuating screw 51 and the sleeve 47.

The spacing between each brake shoe 28 and 41 and the brake disk 20 is set by means of the adjustment screws 32 and 51 in such manner that the displacement of the brake shoe 41 toward the brake shoe 28 resulting from actuating rotary movement of the actuating arm 48 results in the two brake shoes frictionally engaging the brake disk to effect braking thereof. The clearance between the stationary brake shoe 28 and the brake disk is set at a minimum in order to minimize deflection of the brake disk from its plane of rotation when it is frictionally engaged by the two brake shoes. The adjustability of both brake shoes 28 and 41 is thus an important feature of the invention because it enables precise adjustment of the amount of rotary movement of the actuating arm 48 necessary for braking action, take-up for wear of the brake shoes, and minimal deflection of the brake disk when braking is effected. The minimizing of deflection of the brake disk when braking is effected is important because excessive deflection of the brake disk in a direction at right angles to its plane of rotation results in work-hardening of the disk, which may lead to fatigue failure thereof or to permanent deformation thereof in the configuration of circumferential ripples about its peripheral portion. Such circumferential ripples in the brake disk result in inefficient braking action and excessive vibration when the brake is actuated, which causes excess wear of the brake shoes and has generally deleterious effects upon the brake mechanism and the vehicle as a whole.

When the brake is to be actuated, the end 49 of the actuating arm 48 is rotated in the direction indicated with the arrow 65. This rotates the actuating sleeve 47 with respect to the collar 45 and, due to the direction of the lead angle of threaded engagement 46, moves the sleeve and hence the screw 57 inwardly toward the brake shoe 28. This displaces the actuating piston 61 and brake shoe 41 toward the brake shoe 28 to frictionally engage the brake disk 20 on each side with the face of the brake shoe on each side disposed adjacent to the brake disk. The frictional engagement between the brake shoes 41 and 28 and the brake disk 20 effects braking of the rotation of the axle 21. To disengage the brake, the actuating arm 48 is rotated in the opposite direction, which displaces the sleeve 47 and screw 51 in the opposite direction, away from the brake shoe 28, so that the return spring 63 moves the piston 61 away from the brake shoe 28 and thus permits the brake shoes 41 and 28 to again freely float within their receiving openings without frictional engagement with the brake disk 20.

I claim:

1. A disk brake comprising a housing having first and second legs, each with spaced, aligned inside surfaces and with outside surfaces forming a portion of the exterior surface of the housing, said legs being adapted to receive between their inside surfaces a peripheral portion of a rotatable brake disk to be braked, said first leg defining a first cylindrical recess extending into it from its inside surface to define a web in the first leg between the end of said first recess and the outside surface of the first leg, said second leg defining a second circular opening therein concentric with the first recess and extending from the inside surface of the second leg through the second leg to the outside surface thereof, a first cylindrical brake shoe movably disposed in the first recess, a second cylindrical brake shoe movably disposed in the second opening coaxially with the first brake shoe and in spaced relation therefrom, a first adjustment screw threadedly received in the web in the first leg extending from the exterior of the first leg through the web coaxially with the first brake shoe into the first recess to effect engagement with the first brake shoe, means exterior of the housing for releasably fixing the first adjustment screw in fixed rotational position relative to the first leg, whereby the first adjustment screw may be released and rotated to selectively vary the spacing of the first brake shoe from the second brake shoe and releasably fixed to maintain a selected spacing thereof, an actuating piston movably disposed within the second opening in aligned relation with the second brake shoe, a compression spring disposed in compressed condition within the second opening with one end engaging the second leg and the other end engaging the actuating piston, said spring having its end engaging the second leg disposed intermediate its end engaging the actuating piston and the inside surface of the second leg, whereby the actuating piston is biased in a direction away from the first and second brake shoes, an actuating sleeve having a central axis coaxial with the first and second brake shoes disposed on the side of the actuating piston remote from the second brake shoe and having external threads about its central axis, means fixed to the second leg for rotatably and threadedly receiving the external threads on the actuating sleeve so that rotation of the actuating sleeve about its central axis moves it axially of the first and second brake shoes, an actuating arm exterior of the housing fixed to the actuating sleeve and extending radially therefrom for rotation therewith, a second adjustment screw threadedly received through the actuating sleeve by internal threads in the actuating sleeve and extending from the exterior of the housing coaxially with the first and second brake shoes into the second opening to engage the actuating piston, and means exterior of the housing for releasably fixing the second adjustment screw in fixed rotational position relative to the actuating sleeve, whereby the second adjustment screw may be released and rotated to selectively vary the spacing of the second brake shoe from the first brake shoe and releasably fixed to maintain a selected spacing thereof, and rotation of the actuating sleeve rotates the second adjustment screw therewith to move it axially in opposite directions responsive to opposite directions of rotation of the actuating sleeve to correspondingly displace the actuating piston and the second brake shoe toward or away from the first brake shoe.

2. A disk brake comprising a housing having first and second legs, each with spaced, aligned inside surfaces and with outside surfaces forming a portion of the exterior surface of the housing, said legs being adapted to receive between their inside surfaces a peripheral portion of a rotatable brake disk to be braked, said first leg defining a first cylindrical recess extending into it from its inside surface to define a web in the first leg between the end of said first recess and the outside surface of the first leg, said second leg defining a second circular opening therein concentric with the first recess and extending from its inside surface into it, a first cylindrical brake shoe movably disposed in the first recess, a second cylindrical brake shoe movably disposed in the second opening coaxially with the first brake shoe and in spaced relation therefrom, a first adjustment screw threadedly received in the web in the first leg extending from the exterior of the first leg through the web coaxially with the first brake shoe into the first recess to effect engagement with the first brake shoe, means exterior of the housing for releasably fixing the first adjustment screw in fixed rotational position relative to the first leg, whereby the first adjustment screw may be released and rotated to selectively vary the spacing of the first brake shoe from the second brake shoe and releasably fixed to maintain a selected spacing thereof, an actuating piston movably disposed within the second opening in aligned relation with the second brake shoe, a compression spring disposed in compressed condition within the second opening with one end engaging the second leg and the other end engaging the actuating piston, said spring having its end which engages the second leg disposed intermediate the inside surface of the second leg and its end which engages the actuating piston, whereby the actuating piston is biased in a direction away from the first and second brake shoes, an actuating sleeve having a central axis coaxial with the first and second brake shoes disposed on the side of the actuating piston remote from the second brake shoe, first means for mounting the actuating sleeve on the housing for rotation of the actuating sleeve about its central axis, cam means engaging the first means and the actuating sleeve for displacing the actuating sleeve in opposite directions parallel to its central axis responsive to rotation in opposite directions of the actuating sleeve about its central axis relative to the first means, an actuating arm exterior of the housing fixed to the actuating sleeve and extending radially therefrom for rotation therewith, a second adjustment screw threadedly received through the actuating sleeve by internal threads in the actuating sleeve and extending from the exterior of the housing coaxially with the first and second brake shoes into the second opening to engage the actuating piston, and means exterior of the housing for releasably fixing the second adjustment screw in fixed rotational position relative to the actuating sleeve, whereby the second adjustment screw may be released and rotated to selectively vary the spacing of the second brake shoe from the first brake shoe and releasably fixed to maintain a selected spacing thereof, and rotation of the actuating sleeve rotates the second adjustment screw therewith to move it axially in opposite directions responsive to opposite directions of rotation of the actuating sleeve to correspondingly displace the actuating piston and the second brake shoe toward or away from the first brake shoe.

3. A disk brake comprising a housing defining first and second legs having spaced substantially parallel inside surfaces to receive between the inside surfaces a peripheral portion of a rotatable brake disk to be braked, the first leg defining a first recess extending into it from its inside surface, the second leg defining a second recess extending into it from its inside surface and aligned with the first recess, a first brake shoe movably disposed within the first recess, a second brake shoe movably disposed within the second recess in aligned relation with the first brake shoe and in spaced relation therefrom, an actuating piston movably disposed within the second recess in aligned relation with the second brake shoe, spring means disposed within the second recess with one end in engagement with the second leg and the other end in engagement with the actuating piston for yieldingly biasing the actuating piston away from the first brake shoe and second brake shoe, actuating sleeve means aligned with the first and second brake shoes and having a central axis oriented at right angles to the plane of rotation of the brake disk to be braked and to the inside surfaces of the first and second legs, first means fixed to the housing for mounting the actuating sleeve means on the housing for rotation of the actuating sleeve means about its central axis, cam means engaging the actuating sleeve means for displacing the actuating sleeve means and the actuating piston toward and away from the first and second brake shoes responsive to rotation of the actuating sleeve means about its central axis in opposite directions, and arm means exterior of the housing and fixed to the actuating sleeve means for rotating the actuating sleeve means about its central axis.

4. A disk brake comprising a housing defining first and second legs having spaced substantially parallel inside surfaces to receive between the inside surfaces a peripheral portion of a rotatable brake disk to be braked, the first leg defining a first recess extending into it from its inside surface, the second leg defining a second recess extending into it from its inside surface and aligned with the first recess, a first brake shoe movably disposed within the first recess, a second brake shoe movably disposed within the second recess in aligned relation with the first brake shoe and in spaced relation therefrom, an actuating piston movably disposed within the second recess in aligned relation with the second brake shoe, spring means disposed within the second recess with one end in engagement with the second leg and the other end in engagement with the actuating piston for yieldingly biasing the actuating piston away from the first brake shoe and second brake shoe, actuating sleeve means aligned with the first and second brake shoes and having a central axis oriented at right angles to the plane of rotation of the brake disk to be braked and to the inside surfaces of the first and second legs, first means fixed to the housing for mounting the actuating sleeve means on the housing for rotation of the actuating sleeve means about its central axis, cam means engaging the actuating sleeve means for displacing the actuating sleeve means and the actuating piston toward and away from the first and second brake shoes responsive to rotation of the actuating sleeve means about its central axis in opposite directions, arm means exterior of the housing and fixed to the actuating sleeve means for rotating the actuating sleeve means about its central axis, first adjustment means on the housing extending from the first recess to the exterior of the housing for selectively varying the spacing of the first brake shoe from the second brake shoe and releasably holding the first brake shoe in selected spaced relation from the second brake shoe, and second adjustment means on the actuating sleeve means and extending to the exterior of the actuating sleeve means and the housing for selectively varying the spacing of the second brake shoe from the first brake shoe and releasably holding the second brake shoe in selected spaced relation from the first brake shoe.

References Cited in the file of this patent

UNITED STATES PATENTS 2,843,225     Miller _____ July 15, 1958

FOREIGN PATENTS 700,579     Great Britain _____ Dec. 2, 1953